United States Patent [19]
Murakami et al.

[11] Patent Number: 5,435,424
[45] Date of Patent: Jul. 25, 1995

[54] SHIFT DEVICE FOR AUTOMATIC TRANSMISSION

[75] Inventors: Akihiro Murakami; Mitsuyoshi Shimizu, both of Shizuoka, Japan

[73] Assignee: Kabushiki Kaisha Atsumitec, Hamana, Japan

[21] Appl. No.: 134,810

[22] Filed: Oct. 12, 1993

[30] Foreign Application Priority Data

May 11, 1993 [JP] Japan .................. 5-109313

[51] Int. Cl.⁶ .................. B60K 41/28; F16H 59/10
[52] U.S. Cl. .................. 192/4 A; 74/475
[58] Field of Search .................. 192/4 A; 74/475

[56] References Cited

U.S. PATENT DOCUMENTS

| | | | |
|---|---|---|---|
| 5,062,509 | 11/1991 | Carpenter et al. | 192/4 A |
| 5,150,593 | 9/1992 | Kobayashi et al. | 192/4 A X |
| 5,220,984 | 6/1993 | Ruiter | 192/4 A |

FOREIGN PATENT DOCUMENTS

| | | | |
|---|---|---|---|
| 0459417 | 12/1991 | European Pat. Off. | 192/4 A |
| 4-15356 | 1/1992 | Japan | 74/475 |
| 4-5801 | 2/1992 | Japan . | |
| 5-180310 | 7/1993 | Japan | 192/4 A |
| 93/16428 | 8/1993 | WIPO | 74/475 |

Primary Examiner—Richard M. Lorence
Attorney, Agent, or Firm—Armstrong, Westerman, Hattori, McLeland & Naughton

[57] ABSTRACT

In a shift device for an automatic transmission, notches, which are adapted to be engaged by a roller mounted to a detent spring, is defined in an upper surface of a shift restraining plate secured to a base plate, and a surface of a recess defined in an inner surface of the shift restraining plate is formed into a restraining cam surface which is adapted to be engaged by a lock pin. Mounted to an outer surface of the shift restraining plate are a shift lock mechanism for retaining the lock pin in a parking position maintaining groove in the restraining cam surface, and a forcedly-lock-releasing mechanism capable of releasing the operation of the shift lock mechanism by a manual operation. The shift restraining plate is commonly used for a detent mechanism for resiliently retaining a shift lever at any of a plurality of shift positions, and a shift restraining mechanism for restraining the shift position of the shift lever. Thus, it is possible to eliminate a misalignment between both of the detent mechanism and the shift restraining mechanism, and to easily mount the shift lock mechanism and the forcedly-lock-releasing mechamism to the shift restraining plate without obstruction by both of the detent mechanism and the shift restraining mechanism.

10 Claims, 9 Drawing Sheets

SHIFT DEVICE FOR AUTOMATIC TRANSMISSION

BACKGROUND OF THE INVENTION

1. Field of the Invention

The present invention relates to a shift device for an automatic transmission, and particularly, to an improvement in a shift device having a detent mechanism for resiliently retaining a shift lever at any of a plurality of shift positions including a parking position by cooperation with an engage element mounted, through a detent spring, to a shift lever pivotally supported on a base plate, and a shift restraining mechanism for restraining the shift position of the shift lever by cooperation with a lock pin liftably mounted on the shift lever.

2. Description of the Prior Art

In the prior art shift device of this type, a restraining plate of the shift restraining mechanism is integrally formed on a bracket secured to the base plate, and a notch plate of the detent mechanism is secured to the bracket such that the position of the notch plate can be adjusted (see Japanese Utility Model Publication Kokoku No. 5801/92).

In the above prior art device, the shift restraining plate and the notch plate are independently fabricated and coupled to each other. In order to correct any misalignment between these two plates during assembling thereof, it is necessary to adjust the position of mounting of the notch plate to the bracket, which is one of causes for lowering the assembling efficiency.

SUMMARY OF THE INVENTION

Accordingly, it is an object of the present invention to provide a shift device of the type described above, in which any positional misalignment between the detent mechanism and the shift restraining mechanism is eliminated, improving the assembling property.

To achieve the above object, according to a first aspect and feature of the present invention, there is provided a shift device for an automatic transmission, comprising a detent mechanism for resiliently retaining a shift lever at any of a plurality of shift positions including a parking position by cooperation with an engage element mounted, through a detent spring, to a shift lever pivotally supported on a base plate, and a shift restraining mechanism for restraining the shift position of the shift lever by cooperation with a lock pin liftably mounted on the shift lever, wherein a shift restraining plate is disposed on the base plate along a turning direction of the shift lever; the detent mechanism has a plurality of notches which are defined in an upper surface of the shift restraining plate and resiliently engaged by the engage element; a restraining cam surface of the shift restraining mechanism is formed on an inner peripheral surface of a recess provided in an inner surface of the shift restraining plate, the cam surface being engaged by the lock pin; a solenoid-type shift lock mechanism is provided on an outer surface of the shift restraining plate for retaining the lock pin in a parking position maintaining groove defined in the restraining cam surface by deenergization of the shift lock mechanism, when the shift lever is in the parking position, and for releasing the retaining of the lock pin by energization of the shift lock mechanism in response to braking of a vehicle; and a forcedly-lock-releasing mechanism is provided on the outer surface of the shift restraining plate for forcedly releasing the operation of the shift lock mechanism by a manual operation.

With the above first feature of the present invention, it is possible to eliminate the misalignment between the detent mechanism and the shift restraining mechanism, thereby improving the assembling property. In addition, the shift restraining plate also serves as a notch plate, leading to a reduction in number of parts. Moreover, the outer surface of the shift restraining plate is a wide mounting surface which is not interfered at all by the notches and the restraining cam surface and hence, it is possible to easily mount the shift lock mechanism and the forcedly-lock-releasing mechanism to the mounting surface.

According to a second feature of the present invention in addition to the above feature, the shift lock mechanism is comprised of a lock lever pivotally supported in a lever accommodation recess defined in the outer surface of the shift restraining plate to communicate with the parking position maintaining groove, for pivotal or turning movement between a lock position in which an inlet of the parking position maintaining groove is closed, and an unlock position in which the inlet is opened, and an actuator for biasing, by a spring, the lock lever toward the lock position and for turning the lever to the unlock position upon energization, and the forcedly-lock-releasing mechanism is comprised of a driven arm formed continuously with the lock lever to project out of the lever accommodation recess, a releasing lever pivotally supported on the outer surface of the shift restraining plate for turning or pivotal movement between an inoperative position and an operative position, and a return spring capable of retaining the releasing lever at the inoperative position, the releasing lever being provided with a pressure receiving surface to which a manual operational force is applied to turn the releasing lever to the operative position, and a scooping surface for scooping up the driven arm to turn the lock lever to the unlock position during turning movement of the releasing lever toward the operative position.

With the second feature of the present invention, the number of parts constituting each of the shift lock mechanism and the forcedly-lock-releasing mechanism is extremely small, leading to a simplification and hence, a reduction of size of the structure thereof.

The above and other objects, features and advantages of the invention will become apparent from the following description of a preferred embodiment taken in conjunction with the accompanying drawings.

DESCRIPTION OF THE PREFERRED EMBODIMENT

The present invention will now be described by way of a preferred embodiment in connection with the accompanying drawings.

Figure 1:
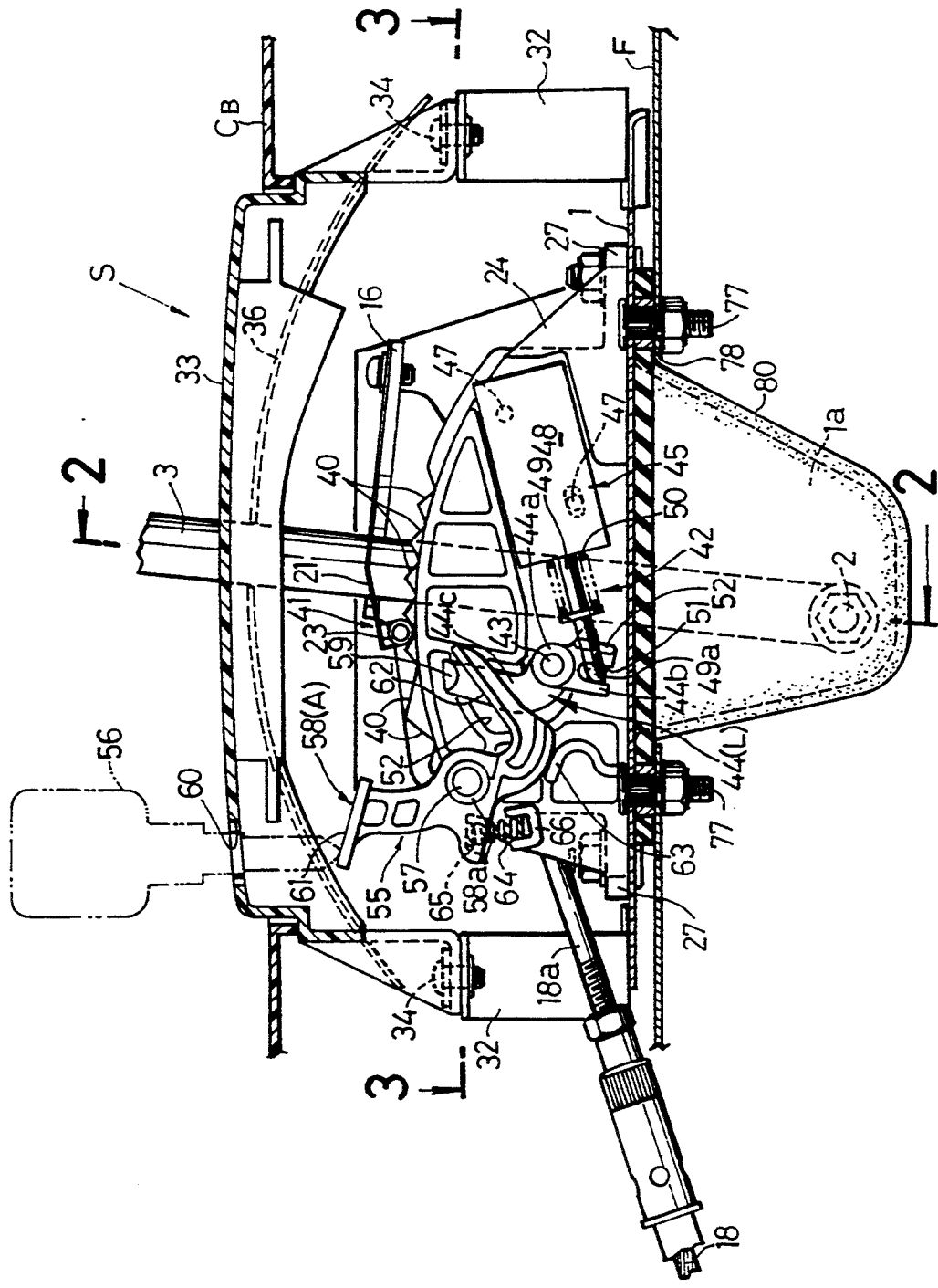
FIG. 1 is a longitudinal sectional side view of a shift device according to the present invention.
Figure 2:
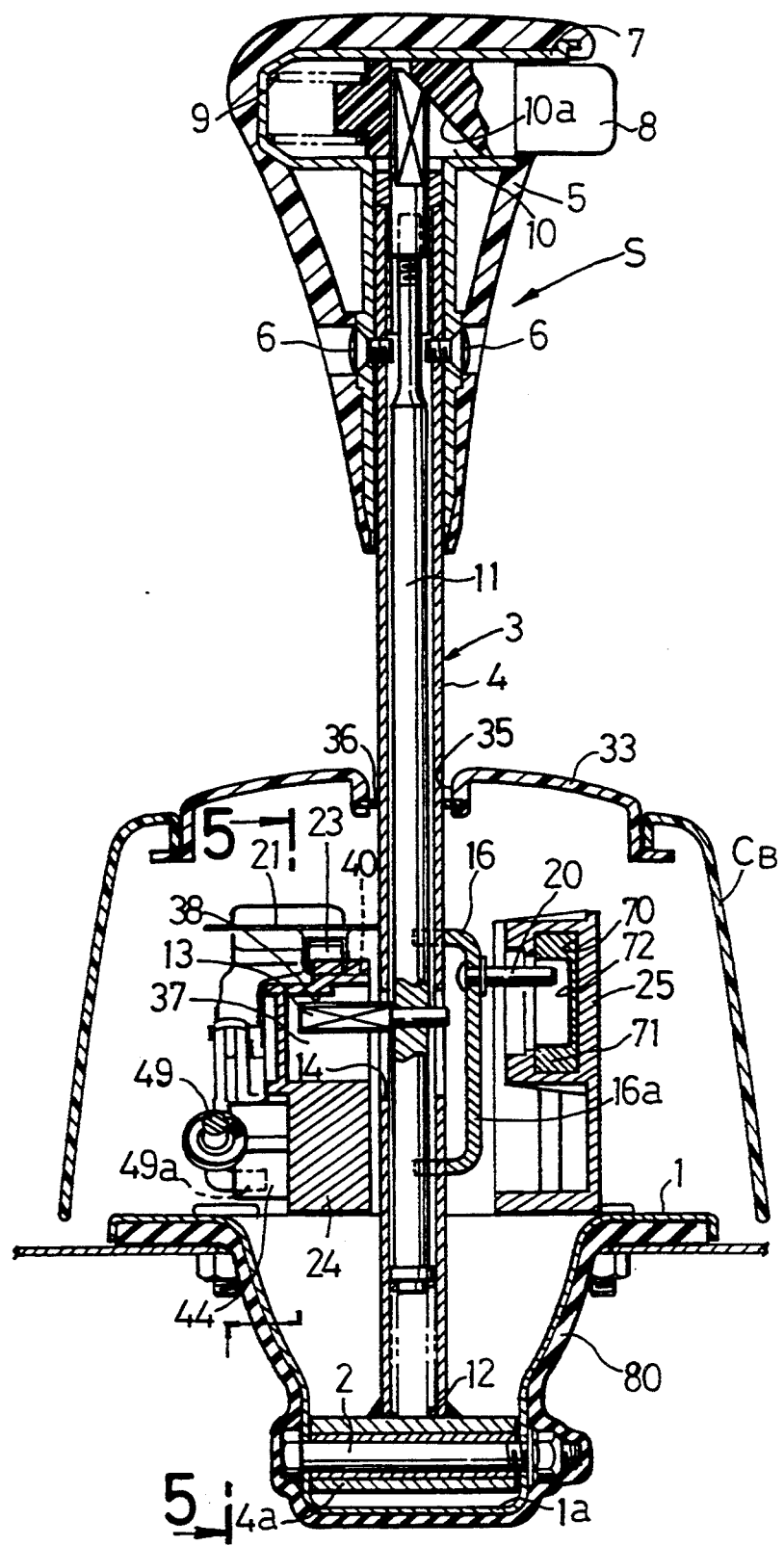
FIG. 2 is a sectional view taken along a line 2—2 in FIG. 1.

Referring first to FIGS. 1 and 2, a bag-like lever supporting portion 1a is formed on a base plate 1 of a shifting device S for an automatic transmission. The lever supporting portion 1a expands downwardly from a central portion of the base plate 1. A shift lever 3 is pivotally supported at its lower end by a single pivot shaft 2. The pivot shaft 2 is laterally supported on the lever supporting portion 1a to extend laterally of a vehicle body. Therefore, the shift lever 3 can be rotated longitudinally of the vehicle body.

The base plate 1 is secured on a floor plate F of a vehicle body by bolts 77 inserted through first mounting holes $75_1$ or second mounting holes $75_2$ (see FIG. 6) in the base plate 1, in a state where the lever supporting portion 1a of the base plate 1 projects downwardly from an opening 78 in the floor plate F. At that time, the opening 78 is sealed by clamping an upper edge of a boot 80 covering the lever supporting portion 1a from below, between the floor plate F and the base plate 1.

The shift lever 3 is composed of a pipe-like lever body 4, and a knob 5 fitted over an upper portion of the lever body 4 and secured by machine screws 6. A boss 4a supported on the pivot shaft 2 is secured to a lower end of the lever body 4. A guide sleeve 7 is provided on the knob 5 to extend laterally of the vehicle body with one end opened toward a driver's seat. Mounted to the guide sleeve 7 are a push button 8 capable of being sunk into and protruded out of the guide sleeve 7, and a button-returning spring 9 for biasing the button 8 in its protruding direction. The push button 8 has a recess 10 having one side surface formed into a slant 10a. A control rod 11 is liftably fitted in the lever body 4, such that an upper end of the rod 11 may be brought into engagement against the slant 10a. A rod returning spring 12 is accommodated in the lever body 4 for biasing the control rod 11 in its lifting direction.

If the push button 8 is pushed into the guide sleeve 7, the control rod 11 can be lowered by the action of the slant 10a.

A lock pin 13 is embedded in the control rod 11 to project in one of right and left directions of the vehicle body. The lever body 4 is provided with an elongated hole 14 which is long in the axial direction of lever 3. The lock pin 13 is passed through the elongated hole 14 such that the lock pin 13 can be lifted and lowered.

Figure 7:
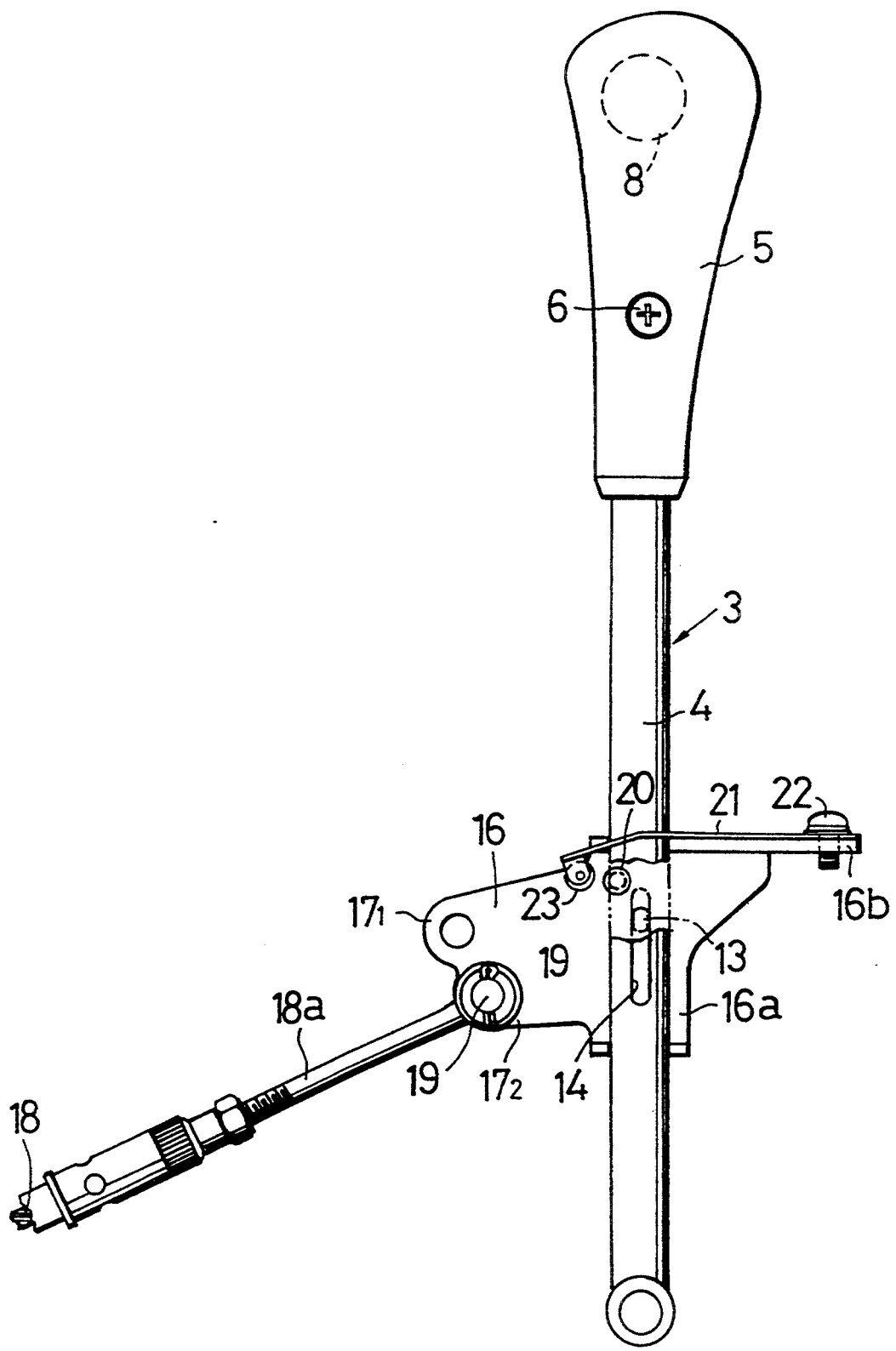
FIG. 7 is a perspective view of a shift lever.
Figure 8:
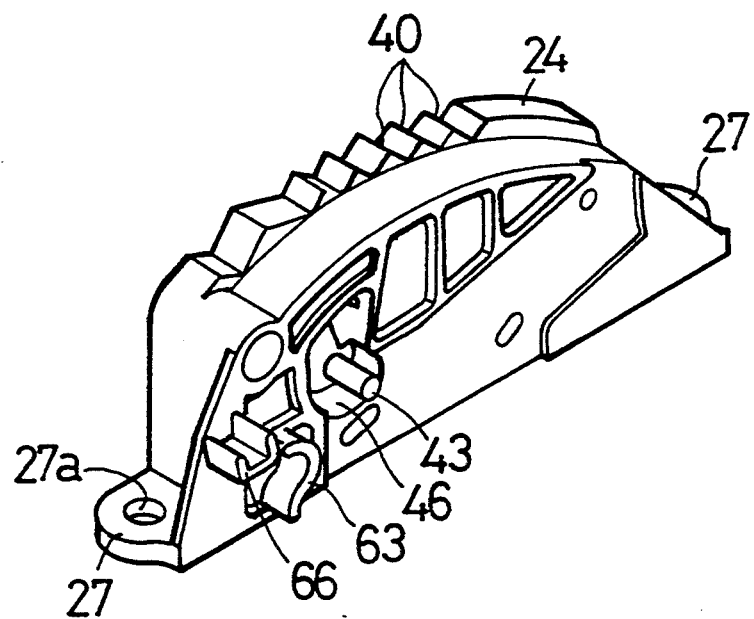
FIG. 8 is a perspective view of a shift restraining plate.

As shown in FIG. 7, a bracket 16 is welded to an intermediate portion of the lever body 4 of the shift lever 3. The bracket 16 is provided with a plurality of connecting bosses $17_1$ and $17_2$ projecting forwardly of the shift lever 3. One of the connecting bosses $17_1$ and $17_2$ is selected and connected, through a connecting pin 19, to a terminal rod 18a of a control wire 18 connected to a manual valve (not shown) of the automatic transmission.

If a case in which the control wire 18 is connected to the upper connecting boss $17_1$, and a case in which the control wire 18 is connected to the lower connecting boss $17_2$ are compared, the amount of control wire 18 operated with the rotation of the shift lever 3 through a unit angle is larger in the former case than the latter case, due to a difference between distances from the pivot shaft 2 of the shift lever 3 to the connecting bosses $17_1$ and $17_2$. Therefore, even when the stroke of the manual valve of the automatic transmission connected to the control wire 18 is varied depending upon the type of vehicle, this can be accommodated by the selection of either one of the upper and lower connecting bosses $17_1$ and $17_2$, and hence, the change of the shift lever 3 is not required.

A switch pin 20 is embodded in a vertical wall lying on the opposite side of the bracket 16 from the projecting direction of the lock pin 13 to project in the opposite direction from the lock pin 13. The bracket 16 has an arm portion 16b extending rearwardly of the shift lever 3. A detent spring 21 formed of a leaf spring is secured to the arm portion 16b by a machine screw 22. This spring 21 has its front end extending to the vicinity of the lock pin 13 of the shift lever 3, and a roller 23 as an engage element is pinned at such front end.

Figure 3:
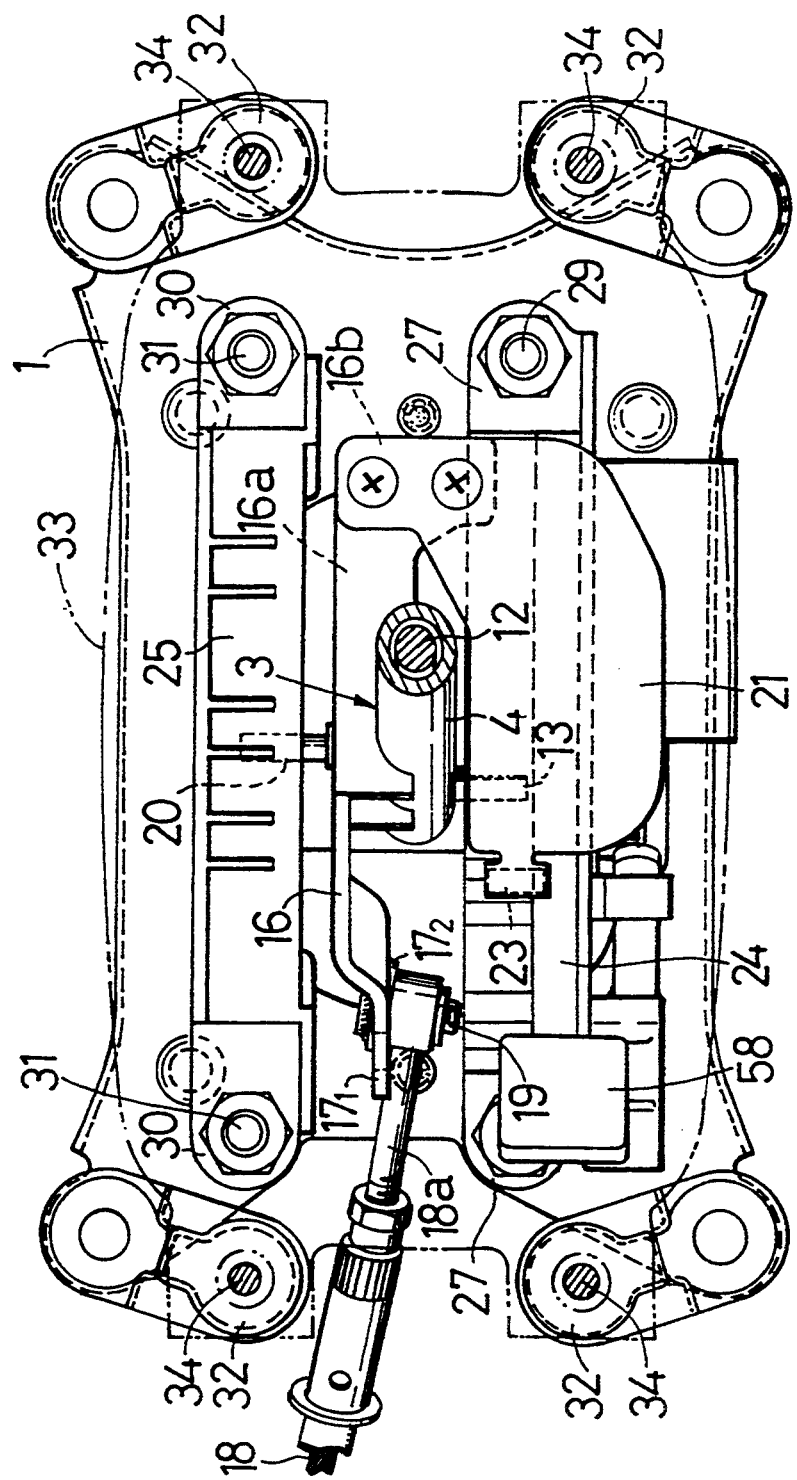
FIG. 3 is a sectional view taken along a line 3—3 in FIG. 1.
Figure 5:
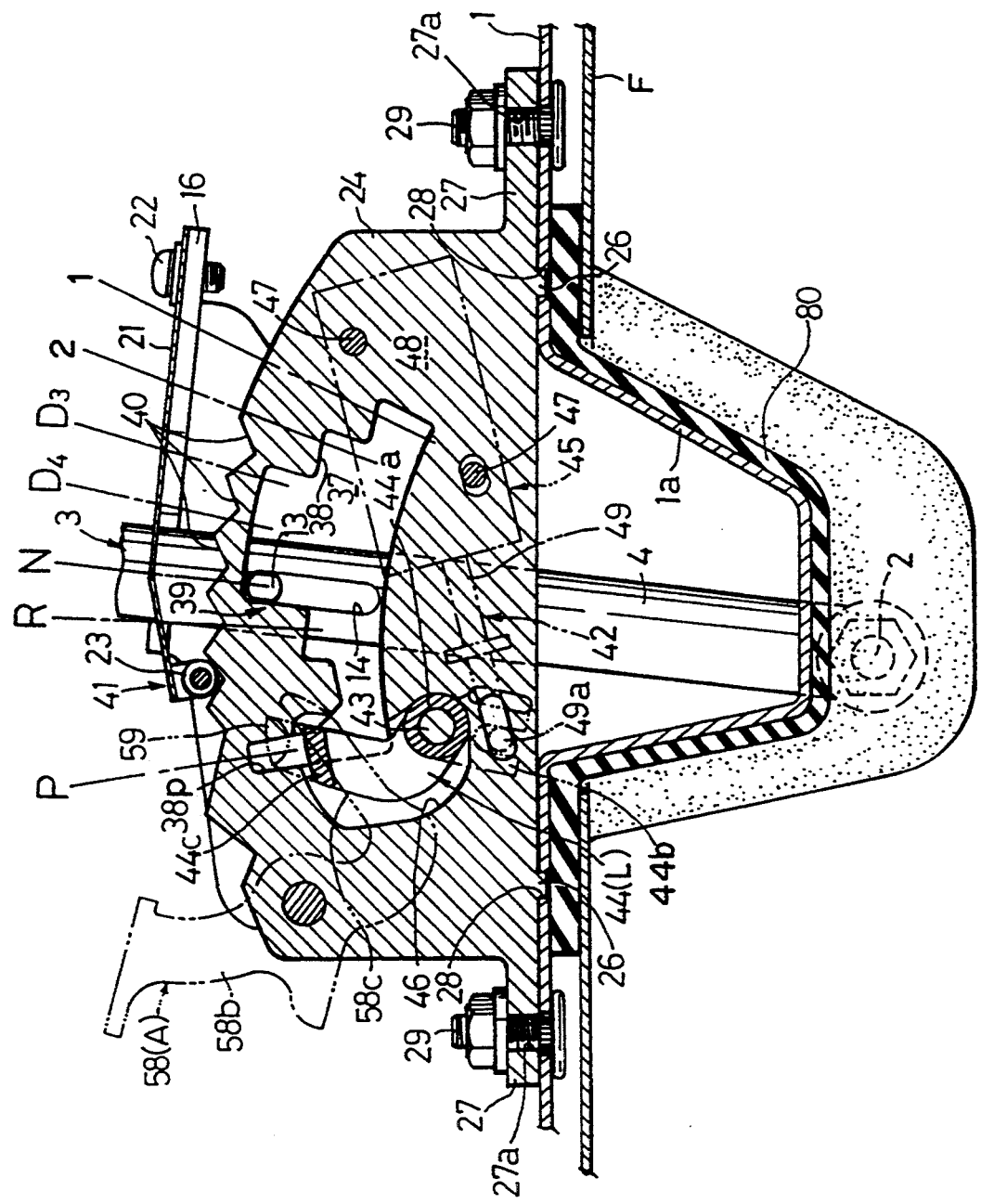
FIG. 5 is a sectional view taken along a line 5—5 in FIG. 2.

As shown in FIGS. 1 to 3, a shift restraining plate 24 is disposed on the base plate 1 on the same side of the shift lever 3 as the lock pin 13, and a switch housing 25 is disposed on the base plate 1 on the same side of the shift lever 3 as the switch pin 20. As shown in FIG. 5, the shift restraining plate 24, which may be made of synthetic resin, is provided at its lower surface with a pair of front and rear positioning projections 26, 26 protruding therefrom, and is also provided at its front and rear ends with ear pieces 27, 27 protruding therefrom. Each of the ear pieces 27, 27 has a bolt bore 27a. The positioning projections 26, 26 are fitted in a pair of front and rear positioning holes 28, 28 provided in the base plate 1, respectively. The ear pieces 27, 27 are secured to the base plate 1 by bolts 29, 29, respectively.

The switch housing 25, which may be made of synthetic resin, is formed with a pair of front and rear ear pieces 30, 30, and each having a bolt bore 30a. The ear pieces 30, 30 are also secured to the base plate 1 by bolts 31, 31, respectively.

Figure 6:
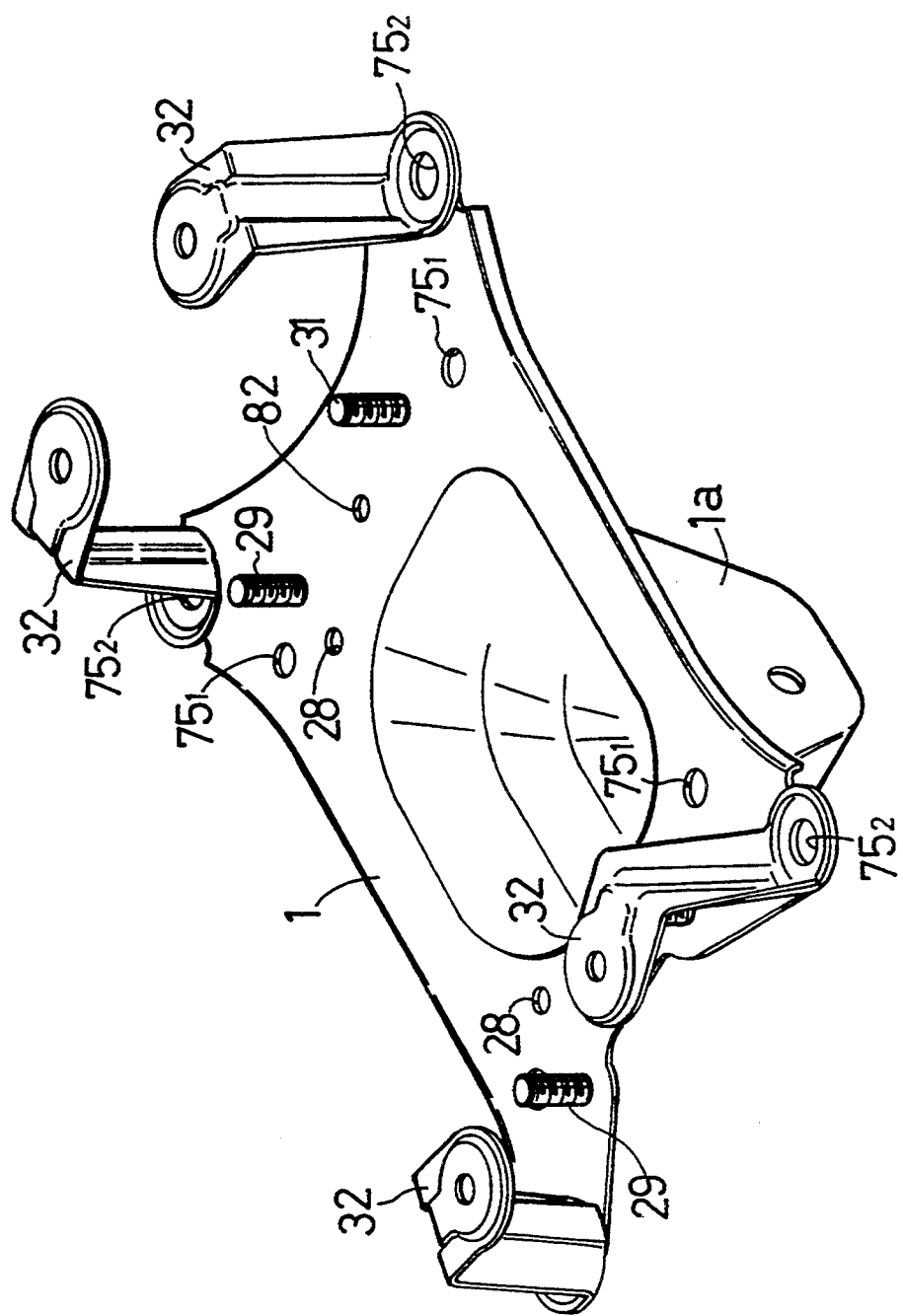
FIG. 6 is a perspective view of a base plate.

As shown in FIGS. 1 and 6, four support posts 32, 32, - - - rise at four corners of the base plate 1. An escutcheon 33 is secured to the support posts 32, 32 - - - by machine screws 34 for covering the shift restraining plate 24 and the switch housing 25. An elongated hole 35 is provided in the escutcheon 33 to permit the turning of the shift lever 3 which passes through the escutcheon 33. The elongated hole 35 is closed by a shutter plate 36 which is moved along with the shift lever 3 (see FIG. 4).

Figure 4:
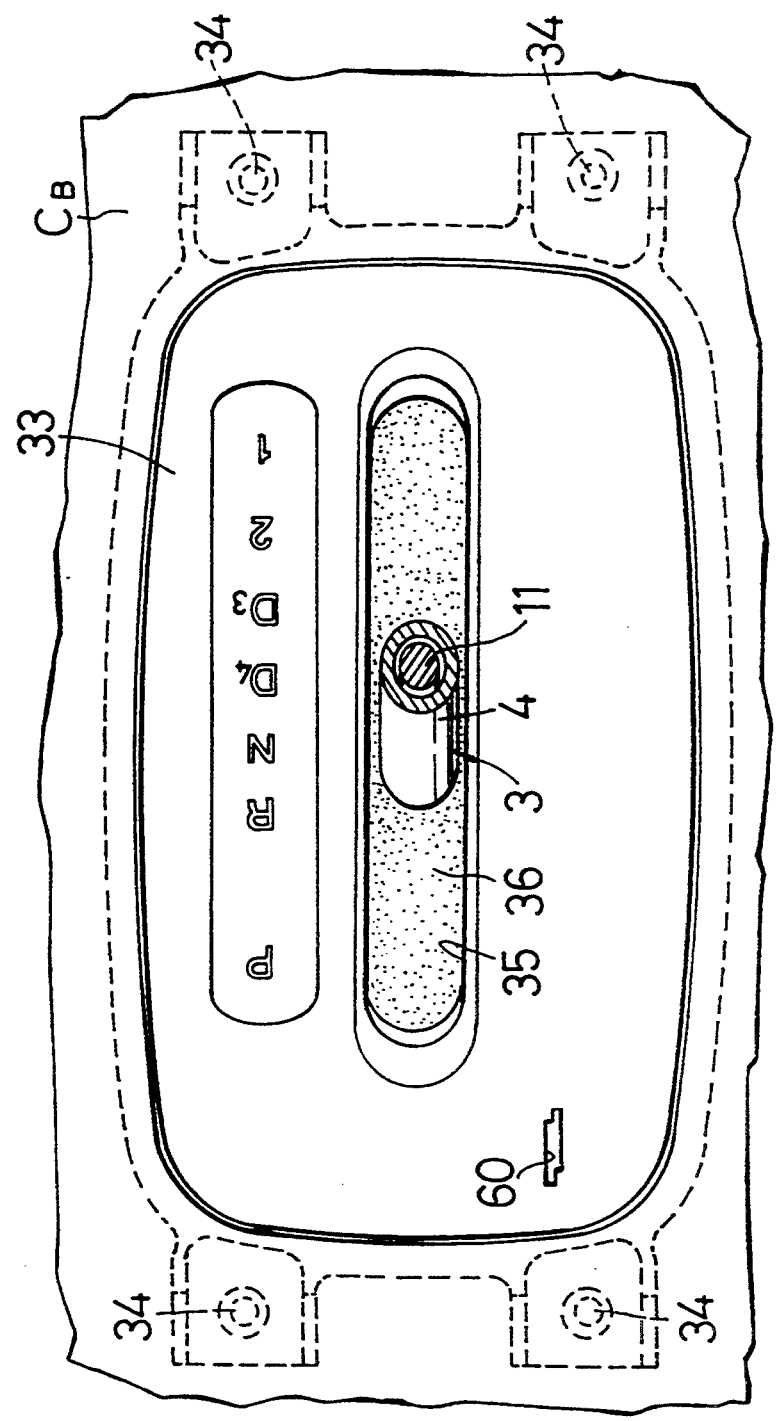
FIG. 4 is a plan view of the shift device shown in FIG. 1.

As shown in FIG. 4, indications are provided on an upper surface of the escutcheon 33 for clearly representing shift positions of the shift lever 3, i.e., a parking position P, a reverse position R, a neutral position N, a four-stage shift drive position $D_4$, a three-stage shift drive position $D_3$, a 2-shift hold position 2, and a 1-shift hold position 1, from the front toward the rear in a direction of turning of the shift lever 3.

The escutcheon 33 is secured to the support posts 32 on the base plate 1 independently from the shift restraining plate 24 and the switch housing 25. Therefore, irrespective of the shift restraining plate 24 and the switch housing 25, the formation, indications and the like of the escutcheon 33 can be modified independently in accordance with the type of vehicle.

The surrounding of the escutcheon 33 is covered with a console box $C_B$.

As shown in FIGS. 2 and 5, a recess 37 having an upper surface functioning as a restraining cam surface 38 is defined in an inner surface of the shift restraining plate 24. The restraining cam surface 38 is brought into engagement with the lock pin 13 to restrain the shift position of the shift lever 3. The restraining cam surface 38 is formed such that portions thereof corresponding to the positions N, $D_4$ and $D_3$ are high; portions corresponding to the positions R and 2 are relatively low, and a portion corresponding to the position 1 is lowest. A portion corresponding to the position P is formed at a higher level than the portion corresponding to the position R, and a downwardly directed projection is provided between these two portions. Thus, the portion corresponding to the position P functions as a parking position maintaining groove $38p$. A lower surface of the recess 37 is formed in the form of an arcuate surface about the pivot shaft 2. A shift restraining mechanism 39 is constructed by the recess 37 and the lock pin 13.

Between the positions N to $D_3$, the shift lever 3 can be turned without lowering the lock pin 13. But the shift lever 3 can not be turned from the position N to the position R, from the position $D_3$ to the position 2 and from the position 2 to the position 1 without pushing the button 8 to lower the lock pin 13. The turning of the shift lever 3 between the positions R and P can be never performed, without lowering the lock pin 13, regardless of the turning direction.

Seven notches 40, 40 corresponding to the positions P to 1 of the shift lever 3 - - - are provided in an upper surface of the shift restraining plate 24. The roller 23 at the front end of the detent spring 21 is brought into engagement with the notch 40 corresponding to each of the shift positions of the shift lever 3 by a resilient force of the spring 21. A detent mechanism 41 is constructed by the notches 40, 40 - - - and the detent spring 21 having the roller 23.

The shift lever 3 is retained in each of the shift positions R to 1 by engagement of the roller 23 with each of the notches 40 under the resilient force of the detent spring 21. Therefore, a driver can feel the shifting operation whenever he or she changes the shift position of the shift lever 3.

The shift restraining plate 24 also serves as a notch plate for the detent mechanism 41 and therefore, a reduction in number of parts is of course achieved. Also when forming the shift restraining plate 24 from synthetic resin, the restraining cam surface 38 and the large number of notches 40, 40 - - - are simultaneously formed and therefore, a misalignment between both of them can be eliminated.

As shown in FIGS. 1, 5, 10A and 10B, the shift restraining plate 24 is provided with a shift lock mechanism 42 which restrains the turning of the shift lever 3 when the shift lever 3 is in the position P. Unless a brake for the vehicle is operated. The shift lock mechanism 42 includes a lock lever 44 supported on an outer surface of the shift restraining plate 24 by a shaft 43 integrally formed therewith, and an actuator, 45 for operating the lock lever 44. The lock lever 44 is constructed into a bell crank-like configuration, and is composed of a boss $44a$ rotatably fitted over the shaft 43, an operating arm $44b$ connected to one end of the boss $44a$, and a lock arm $44c$ connected to the other end of the boss $44a$. The lock arm $44c$ is accommodated in a lever accommodation recess 46 defined in the outer surface of the shift restraining plate 24 so as to communicate with the parking position maintaining groove $38p$. The lock arm $44c$ can be turned between a lock position L in which an inlet of the parking position maintaining groove $38p$ is closed, and an unlock position $U_L$ in which the inlet is opened (see FIG. 10A).

The actuator 45 includes a solenoid 48 secured to the outer surface of the shift restraining plate 24 by a pair of machine screws 47, 47, an operating rod 49 which is pulled inwardly into the solenoid 48 when the solenoid 48 is energized, and a return spring 50 for biasing the operating rod 49 in its protruding direction. The solenoid 48 is connected to a battery through a brake operation sensing switch (not shown) which can be closed in response to the depression of a brake pedal.

The operating rod 49 is provided, at a tip end thereof, with a bent portion $49a$ which is engaged in a connecting groove 51 in the operating arm $44b$. When the operating rod 49 is to be pulled into the solenoid 48, the lock lever 44 is turned to the unlock position $U_L$. When the operating rod 49 is to be protruded out of the solenoid 48, the lock lever 44 is turned to the lock position L.

Figure 10A:
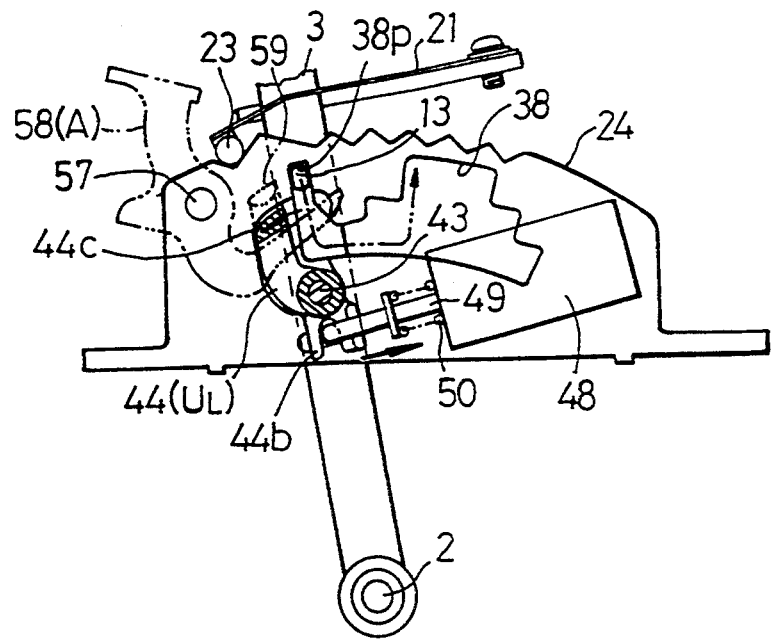
FIG. 10A is a view for explaining the operation of a shift lock mechanism.

Suppose that the shift lever 3 is in the position P, i.e., that the lock pin 13 is in engagement with the parking position maintaining groove $38p$. In this case, if the brake pedal is in a non-operative condition, even if a driver tries to lower the lock pin 13 in order to move the shift lever from the shift position P to another shift position, the lock arm $44c$ which is in the lock position L acts to inhibit the disengagement of the lock pin 13 from the parking position maintaining groove $38p$. Therefore, it is impossible to move the shift lever 3 from the position P. If the brake pedal is depressed, the operating rod 49 is pulled into the solenoid 48 by energization of the solenoid 48, as shown in FIG. 10A, to turn the lock lever 44 to the unlock position $U_L$. Thus, the lock arm $44c$ opens the inlet of the parking position maintaining groove $38p$, so that the disengagement of the lock pin 13 from the groove $38p$ can be carried out to permit the turning of any shift lever 3 to the other position.

When the shift lever 3 is turned from the position R to the position P, if the lock pin 13 has been lowered, even if the solenoid 48 is in its deenergized state, the lock pin 13 causes the lock lever 44 to be pushed to the unlock position $U_L$ against a force of the return spring 50 with the turning movement of the shift lever 3. Therefore, the shift lever 3 can be turned to the position P. Then the lock pin 13 is lifted and fully accommodated in the parking position maintaining groove $38p$, the lock lever 44 is returned to the lock position L by the force of the return spring 50.

As shown in FIG. 1, a protrusion 52 is formed on the operating arm $44b$ of the lock lever 44 for abutting against an inner surface of the operating rod 49. This abutment provides the prevention of slip-off of the lock lever 44 from the shaft 43. Therefore, it is unnecessary to provide an exclusive slip-off preventing member on the shaft 43.

A compulsive lock-releasing mechanism 55 is connected to the shift lock mechanism 42. This mechanism 55 is for forcedly turning the lock lever 44 to the unlock position $U_L$ by utilizing a predetermined key 56 (e.g., an engine key), when the solenoid 48 has fallen into a failure of energization due to excessive electric discharge of a battery, for example, the compulsive lock-releasing mechanism 55 includes a releasing lever 58 pivotally supported on the outer surface of the shift restraining plate 24 by a shaft 57, and a driven arm 59 which is connected to a tip end of the lock arm $44c$. The driven arm 59 protrudes out of the accommodation recess 46 and has a semicylindrical lower surface. The releasing lever 58 includes a first arm 58b extending upwardly from a boss 58a rotatably fitted over the shaft 57, and a second arm 58c extending rearwardly and upwardly from a lower portion of the boss 58a. The first arm 58b has an upper surface formed into a pressure receiving surface 61 which is urged by the predetermined key 56 inserted into a key hole 60 in the escutcheon 33. The second arm 58c has an upper surface formed into a scooping surface 62 for the lower surface of the driven arm 59. The releasing lever 58 can turn between an inoperative position A in which the scooping surface 62 of the second arm 58c is slightly spaced apart from the driven arm 59, and an operative position B (see FIG. 10B) in which the driven arm 59 is scooped up by the scooping surface 62 of the second arm 58c to move the lock lever 44 to the unlock position $U_L$. The inoperative position A is defined by abutment of the lower surface of the second arm 58c against a stopper 63 projectingly provided on the outer surface of the shift restraining plate 24. A compression spring 64 for normally retaining the releasing lever 58 at the inoperative position A is interposed between a recess 65 provided in the releasing lever 58 and a retaining portion 66 provided on the shift restraining plate 24.

Figure 10B:
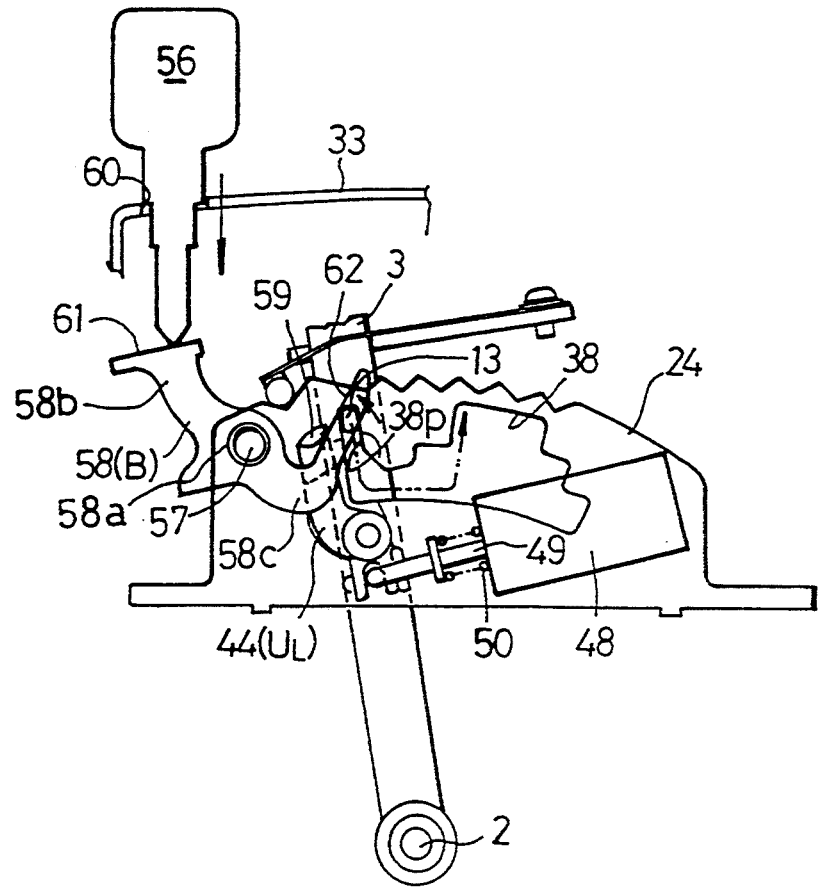
FIG. 10B is a view for explaining the operation of a forcedly-lock-releasing mechanism.

If the key 56 is inserted into the key hole 10 in the escutcheon 33 to urge the pressure receiving surface 61 of the first arm 58b, as shown in FIG. 10B, the releasing lever 58 scoops the driven arm 59 while being turned to the operative position B. Therefore, the lock lever 44 can move to the unlock position $U_L$. This enables the shift lever 3 to be turned from the position P to any other shift position, even when the solenoid 48 is in its non-energizable condition. Such compulsive lock-releasing mechanism 55 is constructed from an extremely small number of parts and is compact. Therefore, the compulsive lock-releasing mechanism 55 can be easily disposed, along with the shift lock mechanism 42, on the narrow outer surface of the same shift restraining plate 24.

Figure 9:
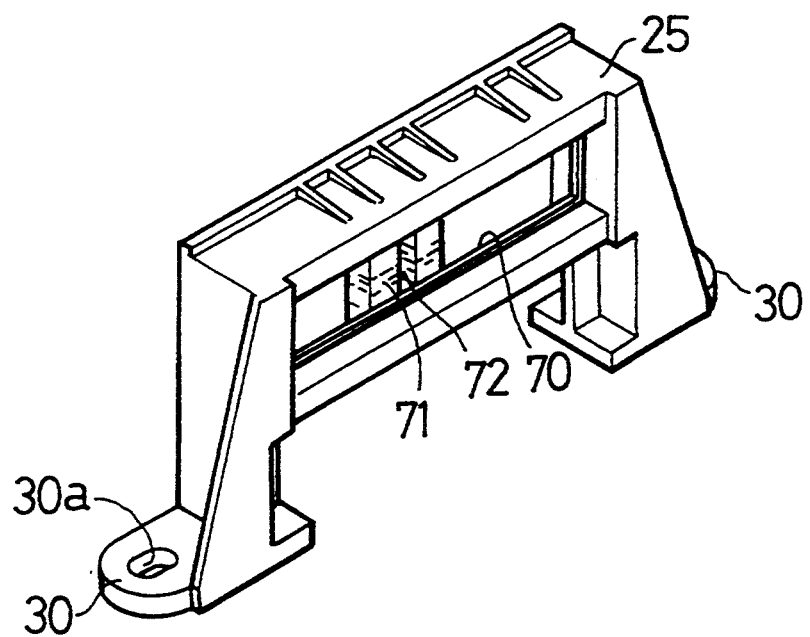
FIG. 9 is a perspective view of a switch housing.

As shown in FIGS. 2 and 9, the switch housing 25 is provided on an inner surface thereof, with a guide groove 70 extending longitudinally along the turning direction of the shift lever 3. And a movable element 71 is slidably received in the guide groove 70. The movable element 71 has a vertical connecting groove 272 provided in its surface opposed to the shift lever and engaged by the switch pin 20. Thus, the movable element 71 is slidable within the switch housing 25 with the turning of the shift lever 3. A switch mechanism is constructed between the movable element 71 and the switch housing 25 for producing signals corresponding to the positions P and I of the shift lever 3. This switch mechanism is of a known type and supplies an operating signal to a shift position indicating lamp mounted on an instrument panel of the automobile and produces a signal indicative of a command to prohibit the operation of an engine starter in the shift positions other than the positions P and N of the shift lever 3.

Since the restraining plate 24 and the switch housing 25 are disposed on the laterally opposite sides of the shift lever 3, the lock pin 13 projecting from one side surface of the shift lever 3 to engage the shift restraining plate 24 can be formed of a minimum length without interference by the switch housing 25. In addition, the switch pin 20 projecting from the other side surface of the shift lever 3 to engage the movable element 71 within the switch housing 25 can be also formed of a minimum length without interference by the shift restraining plate 24. This enables a reduction in moment applied to each of the pins 13 and 14 and an improvement in durability of the pins 13 and 14.

In order to correct a time lag or difference, if any, between a time point when the shift position of the shift lever 3 restrained by the shift restraining plate 24 is established and a time point at which the switch mechanism produces the signal corresponding to such shift position, the pair of bolt bores 30a, 30a in the switch housing 25 are formed as elongated bores defined longitudinally in the turning direction of the shift lever 3. Thus, if the bolts 31, 31 inserted through the bolt bores 30a, 30a are loosened, a very small movement of the switch housing 25 in the turning direction of the shift lever 3 is possible and enables the above-described lag to be corrected.

Although the embodiment of the present invention has been described, it will be understood that the invention is not limited thereto, and various modifications in design can be made without departing from the principle and scope of the invention. For example, the lower surface of the recess 37 can be formed into the restraining cam surface 38 to be engaged by the lock pin 13, and the control rod 11 having the lock pin 13 embedded therein can be lifted during pushing of the push button 8.

What is claimed is;

1. A shift device for an automatic transmission, comprising a detent mechanism for resiliently retaining a shift lever at any of a plurality of shift positions including a parking position by cooperation with an engage element mounted, through a detent spring, to a shift lever pivotally supported on a base plate, and a shift restraining mechanism for restraining the shift position of the shift lever by cooperation with a lock pin liftably mounted on the shift lever, wherein
   a shift restraining plate is disposed on the base plate along a turning direction of the shift lever;
   the detent mechanism has a plurality of notches which are defined on an upper surface of the shift restraining plate and resiliently engaged by the engage element;
   a restraining cam surface of the shift restraining mechanism is formed on an inner periphery of a recess provided in an inner surface of the shift restraining plate, the cam surface being engaged by the lock pin;
   a solenoid-type shift lock mechanism is provided on an outer surface of the shift restraining plate for retaining the lock pin in a parking position maintaining groove defined in the restraining cam surface by deenergization of the shift lock mechanism, when the shift lever is in the parking position, and for releasing the retaining of the lock pin by energization of the shift lock mechanism in response to braking of a vehicle; and
   a forcedly-lock-releasing mechanism is provided on the outer surface of the shift restraining plate for forcedly releasing the operation of the shift lock mechanism by a manual operation.

2. A shift device for an automatic transmission according to claim 1, wherein
   said shift lock mechanism is comprised of a lock lever pivotally supported in a lever accommodation recess defined in the outer surface of the shift restraining plate to communicate with the parking position maintaining groove, for pivotal or turning movement between a lock position for closing an inlet of the parking position maintaining groove, and an unlock position for opening the inlet, and an actuator for biasing, by a spring, the lock lever toward the lock position and for turning the lever to the unlock position upon energization, and said forcedly-lock-releasing mechanism is comprised of a driven arm formed continuously with the lock lever to project out of the lever accommodation recess, a releasing lever pivotally supported on the outer surface of the shift restraining plate for turning or pivotal movement between an inoperative position and an operative position, and a return spring capable of retaining the releasing lever at the inoperative position, said releasing lever being provided with a pressure receiving surface to which a manual operational force is applied to turn the releasing lever to the operative position, and a scooping surface for scooping up the driven arm to turn the lock lever to the unlock position during turning movement of the releasing lever toward the operative position.

3. A shift device for an automatic transmission according to claim 1, wherein
said shift restraining plate is made of synthetic resin.

4. A shift device for an automatic transmission according to claim 2, wherein
said shift restraining plate is made of synthetic resin.

5. A shift device for an automatic transmission, comprising a detent mechanism for resiliently retaining a shift lever at any of a plurality of shift positions including a parking position by cooperation with an engage element mounted, through a detent spring, to a shift lever pivotally supported on a base plate, and a shift restraining mechanism for restraining the shift position of the shift lever by cooperation with a lock pin liftably mounted on the shift lever, wherein a shift restraining plate is disposed on the base plate along a turning direction of the shift lever;

the detent mechanism has a plurality of notches which are defined on an upper surface of the shift restraining plate and resiliently engaged by the engage element;

a restraining cam surface of the shift restraining mechanism is formed on an inner periphery of a recess provided in an inner surface of the shift restraining plate, the cam surface being engaged by the lock pin;

a solenoid-type shift lock mechanism is provided on an outer surface of the shift restraining plate for retaining the lock pin in a parking position maintaining groove defined in the restraining cam surface by deenergization of the shift lock mechanism, when the shift lever is in the parking position, and for releasing the retaining of the lock pin by energization of the shift lock mechanism in response to braking of a vehicle;

a switch housing is disposed on a lateral opposite side of the shift lever;

a switch pin projecting from the lateral opposite side surface of said shift lever and engaging with a movable element within the switch housing; and a forcedly-lock-releasing mechanism is provided on the outer surface of the shift restraining plate for forcedly releasing the operation of the shift lock mechanism by a manual operation.

6. A shift device for an automatic transmission according to claim 5, wherein said shift lock mechanism is comprised of a lock lever pivotally supported in a lever accommodation recess defined in the outer surface of the shift restraining plate to communicate with the parking position maintaining groove, for pivotal or turning movement between a lock position for closing an inlet of the parking position maintaining groove, and an unlock position for opening the inlet, and an actuator for biasing, by a spring, the lock lever toward the lock position and for turning the lever to the unlock position upon energization, and said forcedly-lock-releasing mechanism is comprised of a driven arm formed continuously with the lock lever to project out of the lever accommodation recess, a releasing lever pivotally supported on the outer surface of the shift restraining plate for turning or pivotal movement between an inoperative position and an operative position, and a return spring capable of retaining the releasing lever at the inoperative position, said releasing lever being provided with a pressure receiving surface to which a manual operational force is applied to turn the releasing lever to the operative position, and a scooping surface for scooping up the driven arm to turn the lock lever to the unlock position during turning movement of the releasing lever toward the operative position.

7. A shift device for an automatic transmission according to claim 5, wherein said shift retaining plate is made of synthetic resin.

8. A shift device for an automatic transmission according to claim 6, wherein said shift retaining plate is made of synthetic resin.

9. A shift device for an automatic transmission, comprising a detent mechanism for resiliently retaining a shift lever at any of a plurality of shift positions including a parking position by cooperation with an engage element mounted, through a detent spring, to a shift lever pivotally supported on a base plate, and a shift restraining mechanism for restraining the shift position of the shift lever by cooperation with a lock pin liftably mounted on the shift lever, wherein a shift restraining plate is disposed on the base plate along a turning direction of the shift lever;

the detent mechanism has a plurality of notches which are defined on an upper surface of the shift restraining plate and resiliently engaged by the engage element;

a restraining cam surface of the shift restraining mechansim is formed on an inner periphery of a recess provided in an inner surface of the shift restraining plate, the cam surface being engaged by the lock pin;

a solenoid-type shift lock mechanism is provided on an outer surface of the shift restraining plate for retaining the lock pin in a parking position maintaining groove defined in the restraining cam surface by deenergization of the shift lock mechanism, when the shift lever is in the parking position, and for releasing the retaining of the lock pin by energization of the shift lock mechanism in response to braking of a vehicle;

a forcebly-lock-releasing mechanism is provided on the outer surface of the shift restraining plate for forcedly releasing the operation of the shift lock mechanism by a manual operation;

wherein the shift lock mechanism comprises a lever accommodation recess formed on the outer surface of the shift restraining plate so as to be communicated with the parking position maintaining groove, a lock lever supported on the outer surface of the shift restraining plate in said lever accommodation recess such that the lock lever is pivotable between a lock position for closing an inlet of said parking position maintaining groove and an unlock position for opening said inlet of the parking position maintaining groove, and an actuator directly mounted to the outer surface of the shift restraining plate for actuating said lock lever.

10. A shift device for an automatic transmission according to claim 9, wherein said forcedly-lock-releasing mechanism comprises a driven arm integrally formed on the lock lever of the shift lock mechanism, and a releasing lever pivotally supported on the outer surface of the shift restraining plate at a position adjacent said lever accommodation recess.

* * * * *